May 14, 1957     G. H. KOCH     2,792,512
ELECTRIC MOTOR

Filed Dec. 30, 1953     2 Sheets-Sheet 1

WITNESSES

INVENTOR
Gustav H. Koch
BY
ATTORNEY

May 14, 1957  G. H. KOCH  2,792,512
ELECTRIC MOTOR

Filed Dec. 30, 1953  2 Sheets—Sheet 2

2,792,512
Patented May 14, 1957

2,792,512

ELECTRIC MOTOR

Gustav H. Koch, Springfield, Mass., assignor to Westinghouse Electric Corporation, East Pittsburgh, Pa., a corporation of Pennsylvania Application December 30, 1953, Serial No. 401,232

5 Claims. (Cl. 310—258)

The present invention relates to electric motors, and more particularly to a motor of skeleton frame construction which combines low cost with accuracy of alignment.

The motor of the present invention is particularly intended for applications where the lowest possible cost is required, and where appearance is of somewhat less importance. A skeleton frame construction is well suited for such applications, but conventional low-cost skeleton frame motor designs do not have sufficient accuracy of bearing alignment and air gap concentricity for good performance and quiet operation. Sufficient accuracy can be obtained with these constructions, but only by undesirably increasing the cost. The conventional skeleton constructions, therefore, do not combine low cost and accuracy, and it has always been necessary to sacrifice either one or the other in the design of such motors.

Another disadvantage of conventional skeleton frame motors is that they are inherently noisy in operation, since the bearing brackets are drawn tightly against the laminated stator core, thereby increasing the magnetic noise radiated by the motor.

The principal object of the present invention is to provide an electric motor of skeleton frame construction which combines low cost and great accuracy of air gap concentricity and bearing alignment.

Another object of the invention is to provide an electric motor of skeleton frame construction in which the bearing brackets are accurately positioned with respect to the stator core by means of accurately positioned locating pins rigidly supported in the core, with means for clamping the bearing brackets in accurate position against the ends of the locating pins, thus obtaining accurate bearing alignment and air gap concentricity at low cost.

A further object of the invention is to provide a skeleton frame electric motor having a laminated stator core built up of laminations designed to provide maximum space for the windings with minimum core weight.

Other objects and advantages of the invention will be apparent from the following detailed description, taken in connection with the accompanying drawings in which.

Figure 1:
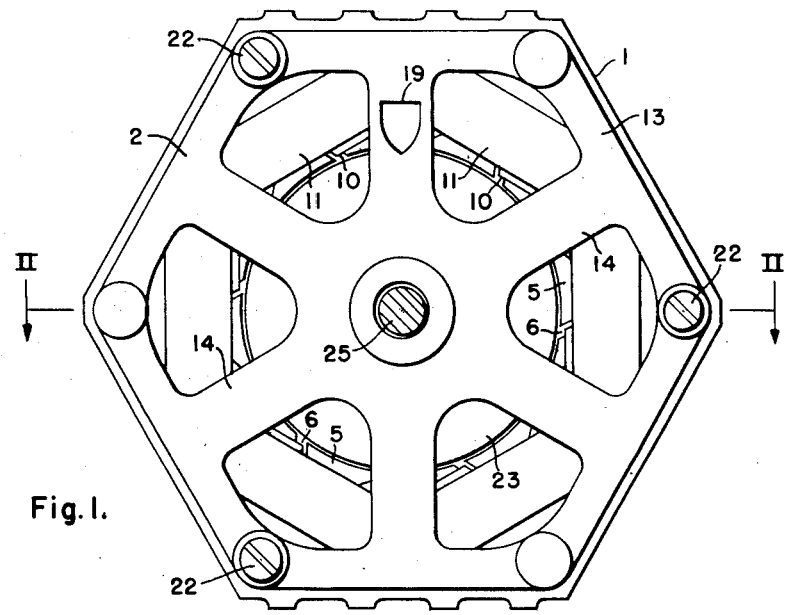
Figure 1 is an end view of an elecrtic motor showing a preferred embodiment of the invention.
Figure 2:
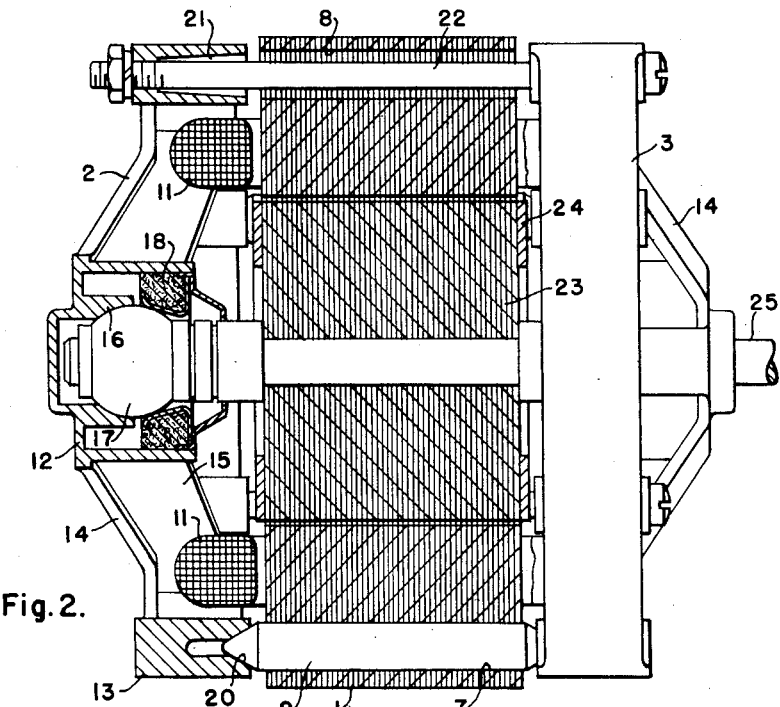
Fig. 2 is a longitudinal sectional view approximately on the line II—II of Fig. 1.
Figure 3:
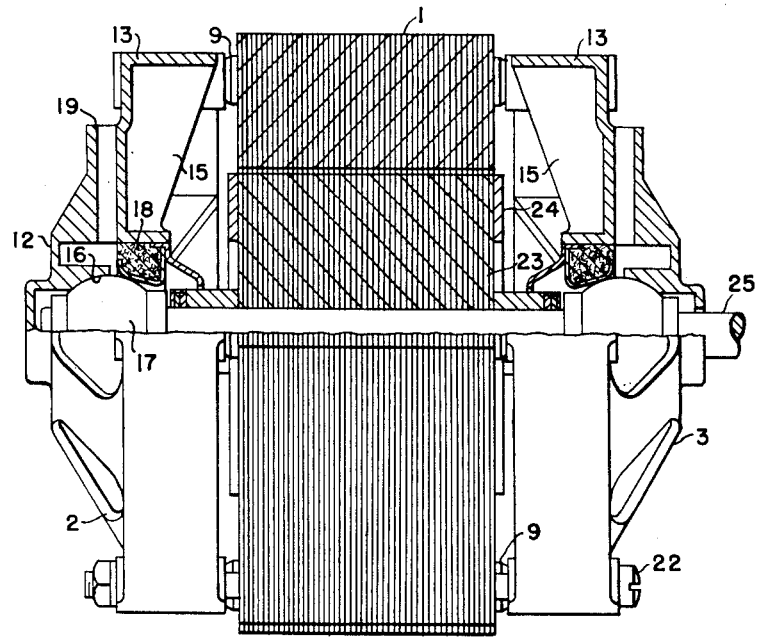
Fig. 3 is a side view, partly in elevation and partly in longitudinal section.
Figure 4:
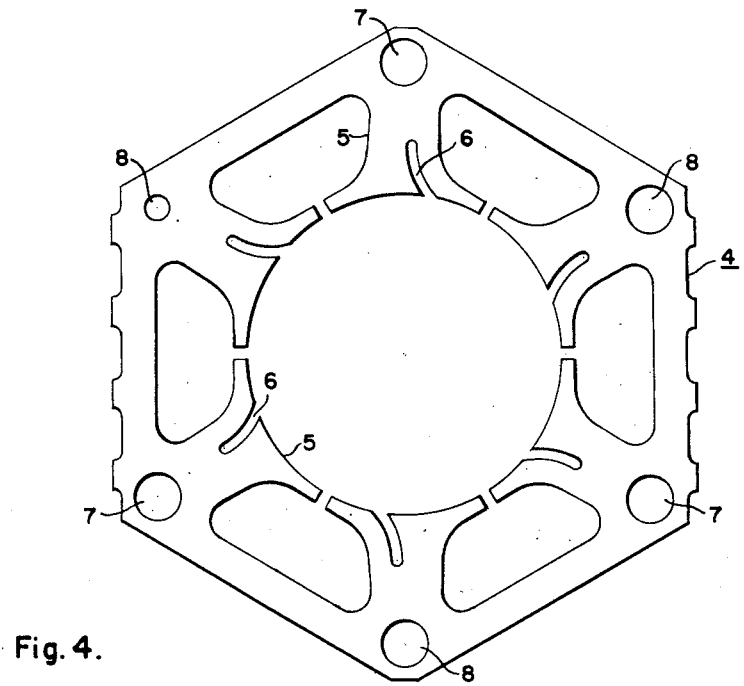
Fig. 4 is a view in elevation of a stator core lamination.

The invention is shown in the drawings, for the purpose of illustration, embodied in a single-phase alternating-current induction motor of the shaded pole type, although it will be understood that the invention may also be applied to other types of dynamoelectric machines. The motor shown in the drawings has a laminated stator core 1 and end brackets 2 and 3. The stator core 1 is built up of laminations 4, preferably of the configuration shown in Fig. 4. The particular motor shown for the purpose of illustration is a six-pole motor, and the laminations 4 are hexagonal in external outline. Salient pole pieces 5 extend radially inward from the vertices of the hexagonal lamination, and are shaped to define a circular bore for the reception of the rotor member. Each pole piece 5 has a generally radial slot 6 for the reception of a shading coil. The slots 6 are shown as being slightly curved but may be made straight, if desired.

Relatively large circular openings 7 are provided in the lamination near the outer periphery opposite alternate pole pieces, that is, at alternate vertices of the hexagonal periphery of the lamination. The openings 7 are accurately sized and are accurately located a predetermined radial distance from the axis of the lamination. This is preferably done by punching the openings 7 in the same die which forms the inner edge of the pole pieces, so that the desired accuracy of positioning of the openings 7, with respect to the axis, is readily obtained without extra cost. Openings 8 are also provided opposite the intervening poles 5 for the reception of through-bolts as described hereinafter. The openings 8 may be of the same size as the openings 7, or of different size, and need not be as accurately positioned as the openings 7, although they can conveniently be punched at the same time.

The laminations 4 are stacked together to form the laminated core 1 and are held together in assembled relation by means of three locating pins 9. The locating pins 9 are steel pins which are hardened and accurately ground to predetermined diameter and length, the diameter being such that the pins will fit tightly in the openings 7. The ends of the pins 9 are conical and the ends are accurately ground to be concentric with the axis of the pin. The laminations 4 are assembled in a stack with the openings 7 aligned to form longitudinal openings extending axially through the core, and the pins 9 are pressed into these axial openings with their ends extending a predetermined distance beyond each end of the core. It will be seen that the conical ends of the pins 9 are thus very accurately positioned with respect to the axis of the core, both radially and longitudinally, and the pins tightly engage the laminations to hold them in assembled relation without the use of rivets or other clamping means.

After assembly of the core, shading coils 10 are inserted in the slots 6 of the poles 5, and main windings 11 of any suitable type are placed on the poles.

The end brackets 2 and 3 are made hexagonal in outline to conform to the hexagonal core, and each end bracket consists of a hub portion 12 and a peripheral rim portion 13, connected by generally radial arms 14 which may be provided with stiffening ribs 15, if desired. The hub portion 12 of each of the brackets 2 and 3 has a spherical bearing seat 16 for receiving a self-aligning bearing 17. The bearings 17 are shown as being of the porous type, and wicking 18 may be packed around them within the hub 12 for supplying oil to the bearing. A suitable oil passage 19 may be formed in the bracket for supplying oil to the wicking.

The rim portion 13 of each end bracket is provided with three conical recesses 20 corresponding in angular position to the locating pins 9. The conical recesses 20 are accurately positioned with respect to each other and to the axis of the bearing, preferably being formed by a coining operation, so that the recesses 20 are accurately positioned to locate the brackets in the proper position with respect to the core 1. The rim portions 13 of the bearing brackets also have axial openings 21 aligned with the openings 8 of the core for the reception of through-bolts 22, or other suitable clamping means.

The brackets 2 and 3 are assembled in place by engaging the conical recesses 20 with the conical ends of the locating pins 9. The brackets are then clamped in place by means of the through-bolts 22, which extend through the openings 8 of the core and 21 of the brackets and draw the brackets tightly against the locating pins. Since the pins 9 are accurately located with respect to the axis of the core, both radially and longitudinally, and since the conical recesses 20 are accurately located with respect to each other and to the bearing axis, it will be apparent that the brackets 2 and 3 will be held in position with the axes of the bearings accurately aligned with each other and with the axis of the core 1, thus insuring great accuracy of bearing alignment and air gap concentricity.

The motor is provided with a rotor member of any suitable type, which is shown as having a laminated core 23 carrying a squirrel-cage winding 24 and mounted on a shaft 25 supported in the bearings 17.

It should now be apparent that an electric motor of skeleton frame construction has been provided which can be produced at relatively low cost, but which provides great accuracy of bearing alignment and air gap concentricity, so that highly satisfactory performance and quiet operation are insured. The desired accuracy is readily obtained by the use of the accurately positioned locating pins which position the brackets 2 and 3 both radially and longitudinally, and also space the brackets away from the core, so that the magnetic noise is not amplified by the brackets. The locating pins 9 also serve to hold the laminations of the core together, thus avoiding the use of rivets or other clamping means for the laminations. The design of the laminations 4 is such that maximum space is provided for the windings 11, but with a minimum amount of material, so that the weight of the core is kept to a minimum.

A six-pole, shaded-pole motor has been shown for the purpose of illustration, but it will be apparent that the invention can be applied to motors having other numbers of poles, and to other types of dynamoelectric machines. It is to be understood, therefore, that although a specific construction has been shown for the purpose of illustration, the invention is not limited to the particular details of construction shown, but includes all equivalent modifications and embodiments.

I claim as my invention:

1. A dynamoelectric machine having a stator member and a rotor member, the stator member including a laminated core, said core having a plurality of axial openings extending therethrough, a plurality of locating pins fitting tightly in said openings and engaging the laminations of the core to hold the laminations together and to be held rigidly in position, the locating pins being accurately positioned radially of the core and having conical ends extending predetermined distances beyond the core at each end, a bracket member disposed at each end of the core, bearings for the rotor member mounted in the bracket members, the bracket members having conical recesses therein accurately positioned radially with respect to the axis of the bearings, the recesses corresponding in number and angular position to the locating pins, the ends of the locating pins engaging the recesses, and means intermediate peripherally adjacent locating pins and independent of the locating pins for clamping the bracket members against the locating pins.

2. A dynamoelectric machine having a stator member and a rotor member, the stator member including a laminated hexagonal core having salient poles thereon, main windings on said poles, axial openings near the periphery of the core opposite alternate poles, a plurality of locating pins rigidly supported in said openings, the locating pins being accurately positioned radially and longitudinally of the core and having conical ends, a bracket member disposed at each end of the core, bearings for the rotor member mounted in the bracket members, the bracket members having conical recesses therein accurately positioned radially with respect to the axis of the bearings, the recesses corresponding in number and angular position to the locating pins, the ends of the locating pins engaging in the recesses, and means intermediate peripherally adjacent locating pins and independent of the locating pins for clamping the bracket members against the locating pins.

3. A dynamoelectric machine having a stator member and a rotor member, the stator member including a laminated hexagonal core having salient poles thereon, main windings on said poles, the poles having curved slots therein, shading coils in said slots, axial openings near the periphery of the core opposite each pole, a plurality of locating pins fitting tightly in alternate ones of said openings and engaging the laminations of the core to hold the laminations together and to be held rigidly in position, the locating pins being accurately positioned radially of the core and having conical ends extending predetermined distances beyond the core at each end, a bracket member disposed at each end of the core, bearings for the rotor member mounted in the bracket members, the bracket members having conical recesses therein accurately positioned radially with respect to the axis of the bearings, the recesses corresponding in number and angular position to the locating pins, the ends of the locating pins engaging in the recesses, and clamping members extending axially of the core through the others of said axial openings and engaging the bracket members to clamp them against the locating pins.

4. A dynamoelectric machine having a stator member and a rotor member, the stator member including a laminated core, said core having a plurality of axial openings extending therethrough, a plurality of locating pins fitting tightly in alternate ones of said openings and engaging the laminations of the core to hold the laminations together and to be held rigidly in position, the locating pins being accurately positioned radially of the core and having conical ends extending predetermined distances beyond the core at each end, a bracket member disposed at each end of the core, bearings for the rotor member in the bracket members, the bracket members having conical recesses therein accurately positioned radially with respect to the axis of the bearings, the recesses corresponding in number and angular position to the locating pins, the ends of the locating pins engaging the recesses, and clamping members extending axially of the core through the others of said axial openings and engaging the bracket members to clamp them against the locating pins.

5. A dynamoelectric machine having a stator member and a rotor member, the stator member including a laminated core, said core having a first set of axial openings extending therethrough, and a second set of axial openings extending therethrough, locating pins fitting tightly in each of said axial openings of said first set and engaging the laminations of the core to hold the laminations together and to be held rigidly in position, the locating pins being accurately positioned radially of the core and having conical ends extending predetermined distances beyond the core at each end, a bracket member disposed at each end of the core, bearings for the rotor member in the bracket members, the bracket members having conical recesses therein accurately positioned radially with respect to the axis of the bearings, the recesses corresponding in number and angular position to the locating pins, the ends of the locating pins engaging the recesses, and clamping members extending axially of the core through said second set of axial openings and engaging the bracket members to clamp them against the locating pins.

References Cited in the file of this patent

UNITED STATES PATENTS

| | | |
|---|---|---|
| 984,260 | Berentsen | Feb. 14, 1911 |
| 1,723,912 | Bergman | Aug. 6, 1929 |
| 2,120,427 | Kronmiller | June 14, 1938 |
| 2,460,063 | Cole | Jan. 25, 1949 |
| 2,591,117 | Ballentine | Apr. 1, 1952 |